US012549885B2

(12) United States Patent
Lin

(10) Patent No.: US 12,549,885 B2
(45) Date of Patent: Feb. 10, 2026

(54) SPEAKER DEVICE AND EARPHONE

(71) Applicant: TOZO INC, Seattle, WA (US)

(72) Inventor: Qi Lin, Shenzhen (CN)

(73) Assignee: TOZO INC, Seattle, WA (US)

( * ) Notice: Subject to any disclaimer, the term of this patent is extended or adjusted under 35 U.S.C. 154(b) by 164 days.

(21) Appl. No.: 18/668,246

(22) Filed: May 20, 2024

(65) Prior Publication Data

US 2024/0305922 A1 Sep. 12, 2024

Related U.S. Application Data

(63) Continuation of application No. PCT/CN2021/141897, filed on Dec. 28, 2021.

(30) Foreign Application Priority Data

Dec. 17, 2021 (CN) ......................... 202111553781.3
Dec. 17, 2021 (CN) ......................... 202123196349.1

(51) Int. Cl.

*H04R 9/06* (2006.01)
*H04R 1/10* (2006.01)
*H04R 9/02* (2006.01)
*H04R 9/04* (2006.01)
*H04R 1/08* (2006.01)

(52) U.S. Cl.

CPC ......... *H04R 1/1075* (2013.01); *H04R 1/1016* (2013.01); *H04R 9/025* (2013.01); *H04R 9/045* (2013.01); *H04R 9/06* (2013.01); *H04R 1/08* (2013.01)

(58) Field of Classification Search

CPC ...... H04R 1/1016; H04R 9/025; H04R 9/045; H04R 9/06
USPC .......................................... 381/386-387, 400
See application file for complete search history.

(56) References Cited

FOREIGN PATENT DOCUMENTS

CN 206559640 U 10/2017
CN 208821015 U 5/2019
CN 111031457 A * 4/2020 ............... H04R 9/06

* cited by examiner

*Primary Examiner* — George C Monikang

(57) ABSTRACT

A speaker device and an earphone include a housing, a coil iron support connected to the housing, a moving iron assembly, and a moving coil assembly. The moving iron assembly and the moving coil assembly are disposed on the coil iron support. A cavity is defined in the housing. A periphery of the coil iron support is embedded in the housing. The coil iron support includes a moving coil supporting portion and a moving iron supporting portion disposed on one side of the moving coil supporting portion. The moving iron assembly is partially disposed on the moving iron supporting portion. The moving coil assembly includes a voice diaphragm, a voice coil, a washer, and a magnet that are stacked in sequence. A periphery of the voice diaphragm is fixedly clamped with an inner side of the moving coil supporting portion.

12 Claims, 11 Drawing Sheets

SPEAKER DEVICE AND EARPHONE

TECHNICAL FIELD

The present disclosure relates to a technical field of speakers, and in particular to a speaker device and an earphone.

BACKGROUND

With upgrading of consumption, various technological products are rapidly updated and iterated, and earphones, as an audio transmission device in the new era, are widely used in daily life. At the same time, a demand for the earphones increases.

A sound generation principle of a conventional earphone is to transmit audio signals through a speaker unit (such as a voice coil unit or a moving iron unit) in the conventional earphone to cause a voice diaphragm to vibrate, which in turn causes air in an earphone cavity to vibrate, thereby forming sound.

In order to improve sound quality and enable the earphones to perform better in both high and low sound ranges, some current earphones use a moving iron unit and a moving coil unit to increase a breadth of a sound range. However, due to a limitation of installation positions, the high and low sound ranges conflict between the moving iron unit and the moving coil unit, so that an actual pronunciation effect is not ideal.

SUMMARY

An object of the present disclosure is to provide a speaker device and an earphone to solve a problem that high and low sound ranges conflict between a moving iron unit and a moving coil unit due to installation positions thereof, so that an actual pronunciation effect is not ideal.

The speaker device comprises a housing, a coil iron support connected to the housing, a moving iron assembly, and a moving coil assembly.

The moving iron assembly and the moving coil assembly are disposed on the coil iron support. A cavity is defined in the housing for accommodating the coil iron support, the moving iron assembly, and the moving coil assembly.

A periphery of the coil iron support is embedded in an inner side of the housing. The coil iron support comprises a moving iron supporting portion and a moving coil supporting portion. The moving iron supporting portion is disposed on one side of the moving coil supporting portion. The moving iron assembly is partially disposed on the moving iron supporting portion. The moving coil assembly comprises a voice diaphragm, a voice coil, a washer, and a magnet. The voice diaphragm, the voice coil, the washer, and the magnet are stacked in sequence. A periphery of the voice diaphragm is fixedly clamped with an inner side of the moving coil supporting portion. The voice coil, the washer, the magnet, and the voice diaphragm are coaxially disposed.

The moving coil assembly further comprises a U-shaped cup and a moving coil support. An upper surface of the moving coil support is attached to an outer edge of a lower end surface of the voice diaphragm. The U-shaped cup is configured to block an inner ring of the moving coil support, so that a lower end of the moving coil assembly is sealed.

In addition, the speaker device of the present disclosure further has following additional technical features.

Furthermore, the moving coil supporting portion is annular. A protruding tongue protruding towards the moving iron supporting portion is disposed on an annular inner wall of the moving coil supporting portion. A first fixing groove is defined in the protruding tongue. The moving iron supporting portion is arched and comprises a fixing portion disposed in a middle portion thereof and connecting arms respectively disposed on two ends thereof. A tail end of each of the connecting arms is connected to the moving coil supporting portion. A second fixing groove is defined on one side, facing the first fixing groove, of a middle portion of the fixing portion. The moving iron assembly is disposed between the first fixing groove and the second fixing groove.

Furthermore, the first fixing groove comprises a first bottom support wall and first clamping walls perpendicular to the first bottom support wall. The first clamping walls and the first bottom support wall are enclosed to form a first L-shaped support structure. The fixing portion is recessed to form the second fixing groove. The second fixing groove comprises a second bottom support wall and second clamping walls perpendicular to the second bottom support wall. The second bottom support wall is parallel to the first bottom support wall. The second clamping walls and the second bottom support wall are enclosed to form a second L-shaped support structure opposite to the first fixing groove.

Furthermore, the housing is bulged. A sound tube is disposed on the housing. The sound tube is circular and hollow. A sound outlet hole is formed in the sound tube. The first clamping walls and the second clamping walls are aligned with the sound outlet hole.

Furthermore, the protruding tongue extends outward to form the first bottom support wall.

Furthermore, a middle portion of the moving iron supporting portion is hollow, so that the protruding tongue and the moving iron supporting portion are enclosed to form a limiting hole.

Furthermore, the speaker device further comprises a pickup microphone, a mounting groove configured to accommodate the pickup microphone is defined on an inner wall of the housing. A shape of the mounting groove is adapted to a shape of the pickup microphone, so that the pickup microphone is embedded in the mounting groove.

Furthermore, at least one protrusion is disposed on the inner ring of the moving coil support. At least one clamping groove is defined on a side wall of the U-shaped cup. The at least one clamping groove is matched with the at least one protrusion.

Furthermore, a slot is defined on one side of the moving coil support facing the coil iron support. The moving coil supporting portion is partially accommodated in the slot.

Furthermore, at least one sound-transmitting hole is defined on the moving coil support, and the at least one sound-transmitting hole penetrates the moving coil support in an axial direction thereof.

Furthermore, the at least one sound-transmitting hole is arc-shaped and extends along an edge of the moving coil support.

The present disclosure further provides an earphone. The earphone comprises the speaker device mentioned above.

Compared with the prior art, the speaker device comprises both the moving coil assembly and the moving iron assembly. The moving coil assembly and the moving iron assembly make up for each other's shortcomings, realizing complementary high and low audio frequencies, thereby increasing a sound range of the speaker device. Moreover, the moving iron assembly and the moving coil assembly are respectively assembled on two sides of the coil iron support, so that sound emitted by the moving coil assembly and the moving iron assembly resonates in the cavity, optimizing an output sound quality effect. In addition, the coil iron support facilitates assembly and disassembly of the moving iron assembly and the moving coil assembly, and optimizes production and maintenance processes of the speaker device.

Additional aspects and advantages of the present disclosure are set forth in part in the description below, and in part are obvious from the description, or may be learned by practice of the present disclosure.

REFERENCE NUMBERS IN THE DRAWINGS

| | | | |
|---|---|---|---|
| Housing | 10 | Through hole | 11 |
| Sound tube | 12 | Clamping portion | 121 |
| Sound outlet hole | 122 | Mounting groove | 13 |
| coil iron support | 20 | Moving iron support | 21 |
| Fixing portion | 211 | Second fixing groove | 2111 |
| Second bottom support wall | 2112 | Second clamping wall | 2113 |
| | | Moving coil supporting portion | 22 |
| Connecting arm | 212 | | |
| | | First fixing groove | 2211 |
| Protruding tongue | 221 | First clamping wall | 2213 |
| First bottom support wall | 2212 | Moving coil assembly | 40 |
| | | Voice coil | 42 |
| Moving iron assembly | 30 | magnet | 44 |
| Voice diaphragm | 41 | Clamping groove | 451 |
| Washer | 43 | protrusion | 461 |
| U-shaped cup | 45 | Sound-transmitting hole | 463 |
| Moving coil support | 46 | | |
| Slot | 462 | | |
| Pickup microphone | 50 | | |

The following specific embodiments further illustrate the present disclosure in conjunction with the above-mentioned drawings.

DETAILED DESCRIPTION

For ease of understanding the present disclosure, the present disclosure is described fully hereinafter with reference to the accompanying drawings. Several embodiments of the present disclosure are given in the accompanying drawings. However, the present disclosure may be implemented in many different forms and is not limited to the embodiments described herein. On the contrary, a purpose of providing these embodiments is to make the disclosure of the present disclosure more thorough and comprehensive.

It should be noted that when an element is referred to as being "fixed to" another element, it may be directly fixed to another element or indirectly fixed to another element through intervening elements. When the element is considered to be "connected" to another element, it may be directly connected to another element or intervening elements may be present at the same time. The terms "vertical", "horizontal", "left", "right", and the like, as used herein, are for illustrative purposes only.

Unless otherwise defined, all technical and scientific terms used herein have the same meaning as commonly understood by those skilled in the art of the present disclosure. The terms used in the specification of the present disclosure are only for the purpose of describing specific embodiments, and are not intended to limit the present disclosure. As used herein, the term "and/or" includes all combinations including one or more of associated listed items.

Figure 1:
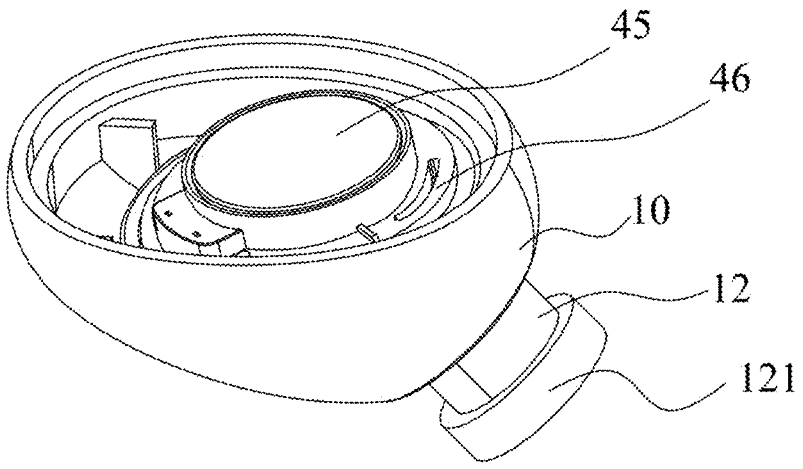
FIG. 1 is a perspective schematic diagram of a speaker device according to one embodiment of the present disclosure.
Figure 2:
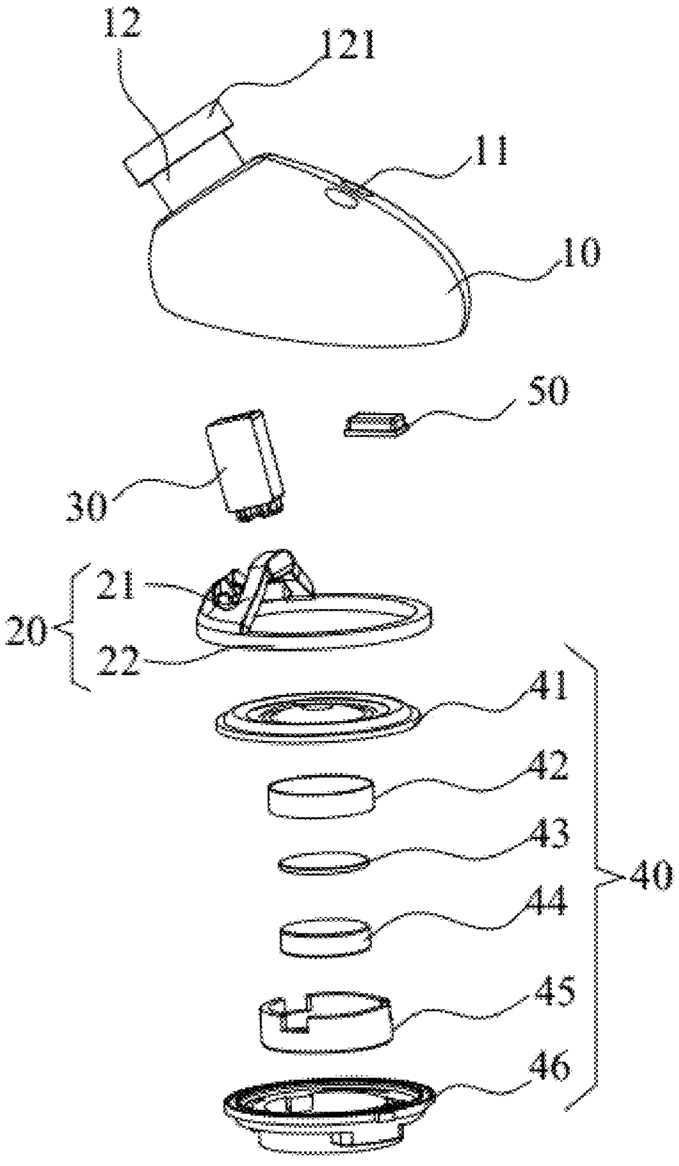
FIG. 2 is an exploded schematic diagram of the speaker device shown in FIG. 1.

As shown in FIGS. 1 and 2, one embodiment of the present disclosure provides a speaker device. The speaker device comprises a housing 10, a coil iron support 20 connected to the housing 10, a moving iron assembly 30, and a moving coil assembly 40. The moving iron assembly 30 and the moving coil assembly 40 are disposed on the coil iron support 20.

The housing 10 is bulged. A cavity is defined in the housing 10 for accommodating the coil iron support 20, the moving iron assembly 30, and the moving coil assembly 40.

Two through holes 11 are defined on a top portion of the housing 10 facing the coil iron support 20. The through holes 11 are configured to assemble with electrical connection devices (such as soldering pins). A sound tube 12 is disposed on the housing 10. A clamping portion 121 is disposed on one end of the sound tube 12, and a diameter of the clamping portion 121 is greater than a diameter of the sound tube 12. The sound tube 12 is circular and hollow. The clamping portion 121 is configured to clamp and fix a soft earplug. A sound outlet hole 122 is formed in the sound tube 12. Sound in the cavity is transmitted from the sound outlet hole 122.

Figure 3:
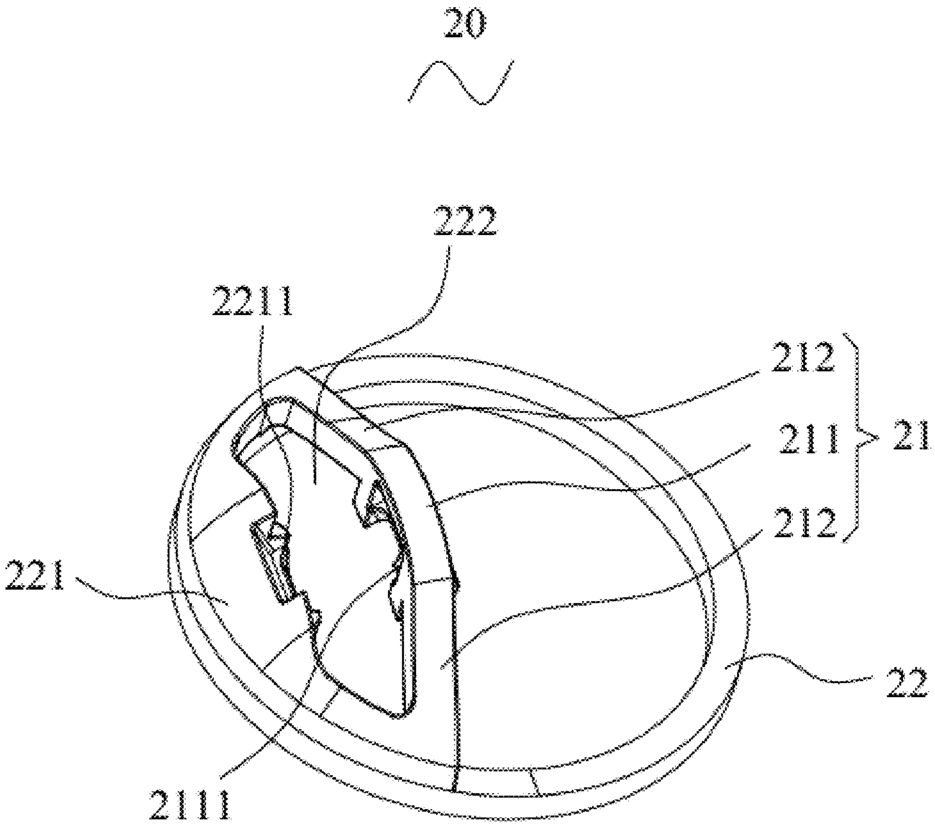
FIG. 3 is a schematic diagram of a coil iron support of the speaker device shown in FIG. 1.
Figure 4:
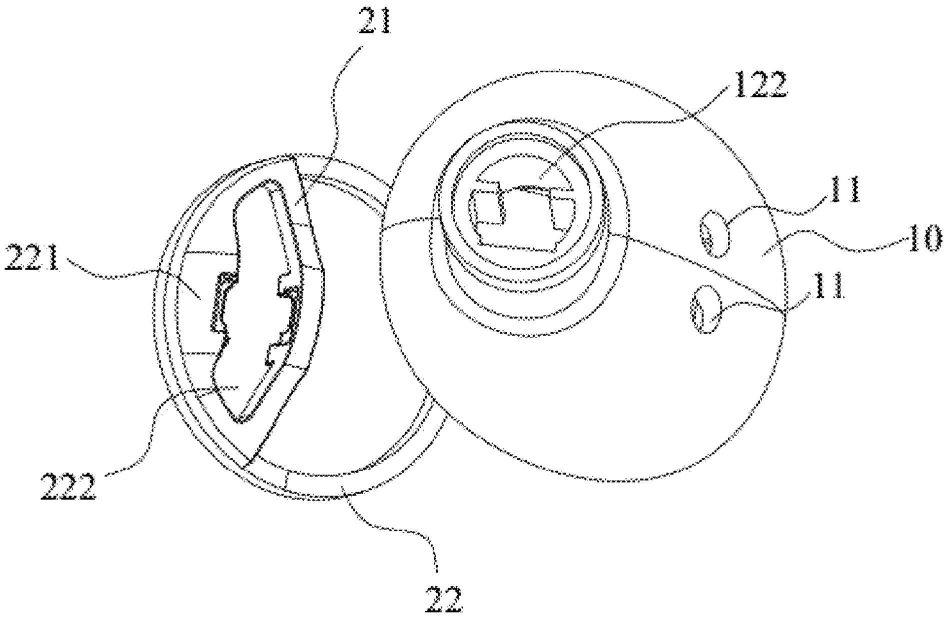
FIG. 4 is an exploded schematic diagram showing that the coil iron support is separated from a housing.
Figure 5:
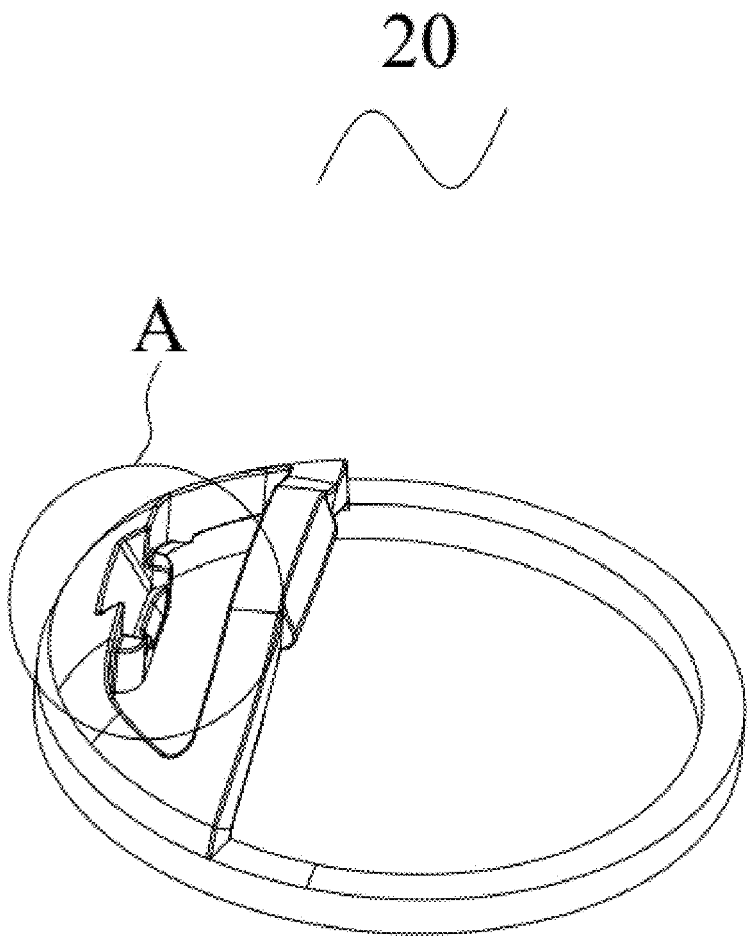
FIG. 5 is another schematic diagram of the coil iron support of the speaker device
Figure 6:
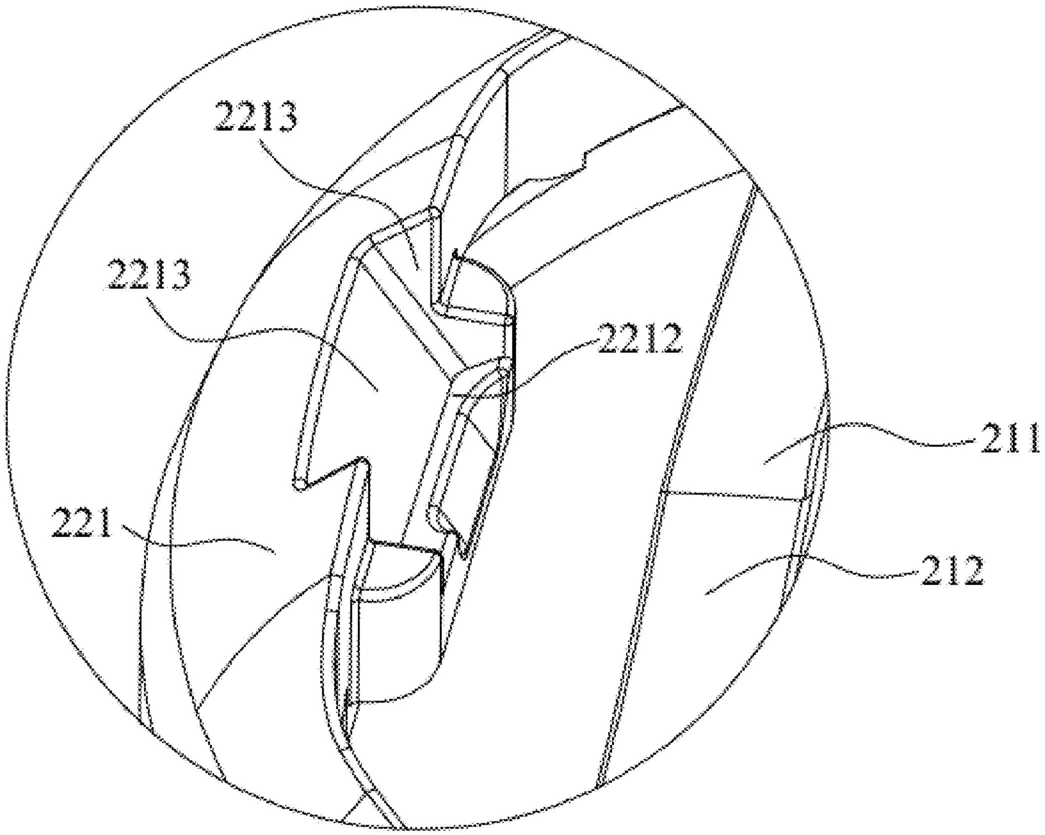
FIG. 6 is an enlarged schematic diagram of portion A shown in FIG. 5.
Figure 7:
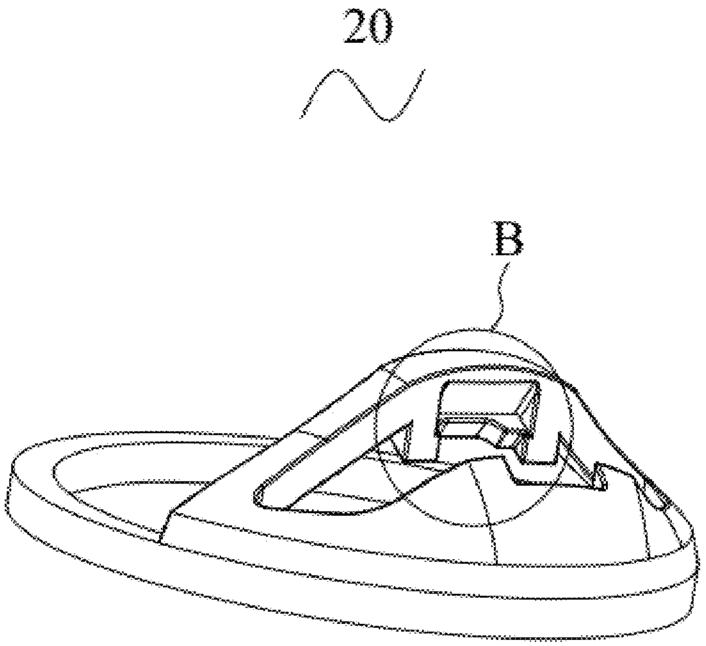
FIG. 7 is another schematic diagram of the coil iron support of the speaker device
Figure 8:
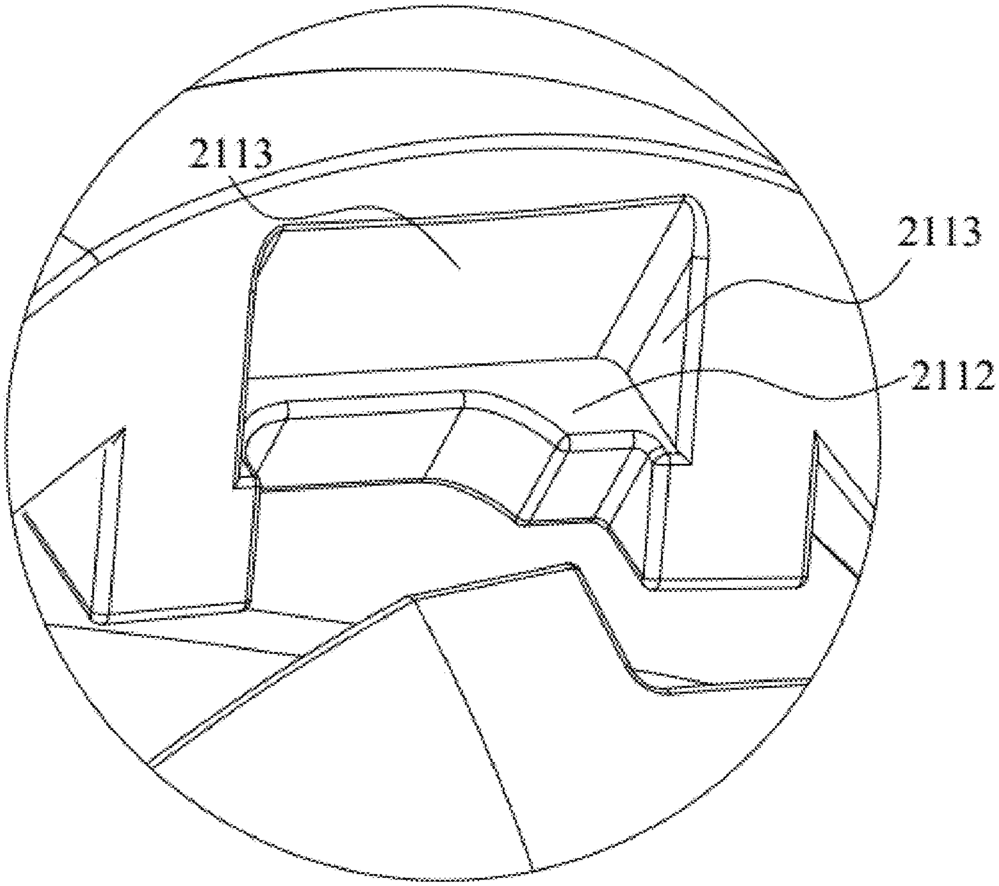
FIG. 8 is an enlarged schematic diagram of portion B shown in FIG. 7.

As shown in FIGS. 3 and 4, a periphery of the coil iron support 20 is embedded in an inner side of the housing 10. The inner side of the housing 10 defines the cavity. The coil iron support 20 comprises a moving iron supporting portion 21 and a moving coil supporting portion 22. The moving coil supporting portion 22 is annular. The moving iron supporting portion 21 is disposed on one side of the moving coil supporting portion 22. Specifically, in the embodiment of the present disclosure, the moving coil supporting portion 22 and the moving iron supporting portion 21 are disposed from top to bottom. The moving iron supporting portion 21 is disposed on one side close to the sound tube 12 of the housing 10, and the moving coil supporting portion 22 is disposed below the moving iron supporting portion 21.

A protruding tongue 221 protruding towards the moving iron supporting portion 21 is disposed on an annular inner wall of the moving coil supporting portion 22. A first fixing groove 2211 is defined in the protruding tongue 221. The moving iron supporting portion is arched and comprises a fixing portion 211 disposed in a middle portion thereof and connecting arms 212 respectively disposed on two ends thereof. A tail end of each of the connecting arms 212 is connected to the moving coil supporting portion 22. Specifically, a distance between tail ends of the connecting arms 212 is less than an inner diameter of the moving coil supporting portion 22. A second fixing groove 2111 is defined on one side, facing the first fixing groove 2211, of a middle portion of the fixing portion 211.

Furthermore, as shown in FIGS. 5-8, the first fixing groove 2211 comprises a first bottom support wall 2212 and first clamping walls 2213 perpendicular to the first bottom support wall 2212. The first clamping walls 2213 and the first bottom support wall 2212 are enclosed to form a first L-shaped support structure. The fixing portion 211 is recessed to form the second fixing groove 2111. The second fixing groove 2111 comprises a second bottom support wall 2112 and second clamping walls 2113 perpendicular to the second bottom support wall 2112. The second bottom support wall 2112 is parallel to the first bottom support wall 2212. The second clamping walls 2113 and the second bottom support wall 2112 are enclosed to form a second L-shaped support structure opposite to the first fixing groove 2211. During assembly, a bottom portion of the moving iron assembly 30 is supported by the first bottom support wall 2212 and the second bottom support wall 2112, and side portions of the moving iron assembly 30 are limited by the first clamping walls 2213 and the second clamping walls 2113, so that the moving iron assembly 30 is partially accommodated in an upper end of the coil iron support 20. Therefore, internal sounding components of the speaker device are simple to assemble, stable in assembly, and good in assembly effect.

Furthermore, in the embodiment, the protruding tongue 221 extends outward to form the first bottom support wall 2212. The first bottom support wall 2212 not only strengthens support for the moving iron assembly 300, but also optimizes a space for the sound produced by the voice diaphragm 41.

Furthermore, a middle portion of the moving iron supporting portion 21 is hollow, so that the protruding tongue 221 and the moving iron supporting portion 21 are enclosed to form a limiting hole 222. Audio generated by vibration of the voice diaphragm 41 is transmitted outwards through the limiting hole 222, so that the audio emitted by the voice diaphragm 41 is less likely to be blocked. Therefore, an audio transmission effect of the voice diaphragm 41 is ideal. In addition, the moving iron supporting portion 21 greatly improves a volume of the cavity in the housing since the moving iron supporting portion 21 is arched toward the inner wall of the housing 10, so that an audio output effect is good.

In the embodiment, the first clamping walls 2213 and the second clamping walls 2113 are aligned with the sound outlet hole 122, so that the moving iron assembly 30 faces the sound outlet hole 122 after being assembled, and a sound output direction of the moving iron assembly directly faces the sound outlet hole 122, which optimized a sound effect.

Furthermore, the moving iron assembly 300 is in a shape of a cylinder. The moving iron assembly 30 is disposed on the moving iron supporting portion 21, Specifically, the moving iron assembly 30 is disposed between the first fixing groove 2211 and the second fixing groove 2111.

Furthermore, the moving coil assembly 40 comprises a voice diaphragm 41, a voice coil 42, a washer 43, and a magnet 44. The voice diaphragm 41, the voice coil 42, the washer 43, and the magnet 44 are stacked in sequence. A periphery of the voice diaphragm 41 is fixedly clamped with an inner side of the moving coil supporting portion 22. The voice coil 42, the washer 43, the magnet 44, and the voice diaphragm 41 are coaxially disposed. The moving coil assembly 40 further comprises a U-shaped cup 45 and a moving coil support 46. An upper surface of the moving coil support 46 is attached to an outer edge of a lower end surface of the voice diaphragm 41. The U-shaped cup 45 is configured to block an inner ring of the moving coil support 46, so that a lower end of the moving coil assembly 40 is sealed.

In the embodiment of the present disclosure, during actual production and assembly process, the moving iron assembly 30 is inserted into the coil iron support 20 for assembling. The voice diaphragm 41, the voice coil 42, the washer 43, and the magnet 44 are sequentially stacked and assembled to form the moving coil assembly 40, and then the moving coil assembly 40 is assembled with the coil iron support 20, so that the internal sounding components of the speaker device are simple to assemble, stable in assembly, and good in assembly effect. At the same time, sound production areas of the moving iron assembly 30 and the moving coil assembly 400 are located in the cavity defined by the voice diaphragm 41, the coil iron support 20, and the housing 10. By using the moving iron assembly 30, clear and melodious sound quality of middle and high voice bands is achieved, and by using the moving coil assembly 40, steady sound quality in low voice bands is achieved. The sound emitted by the moving iron assembly 30 and the moving coil assembly 40 forms resonance in the cavity, which optimizes the sound quality of output audio.

Figure 9:
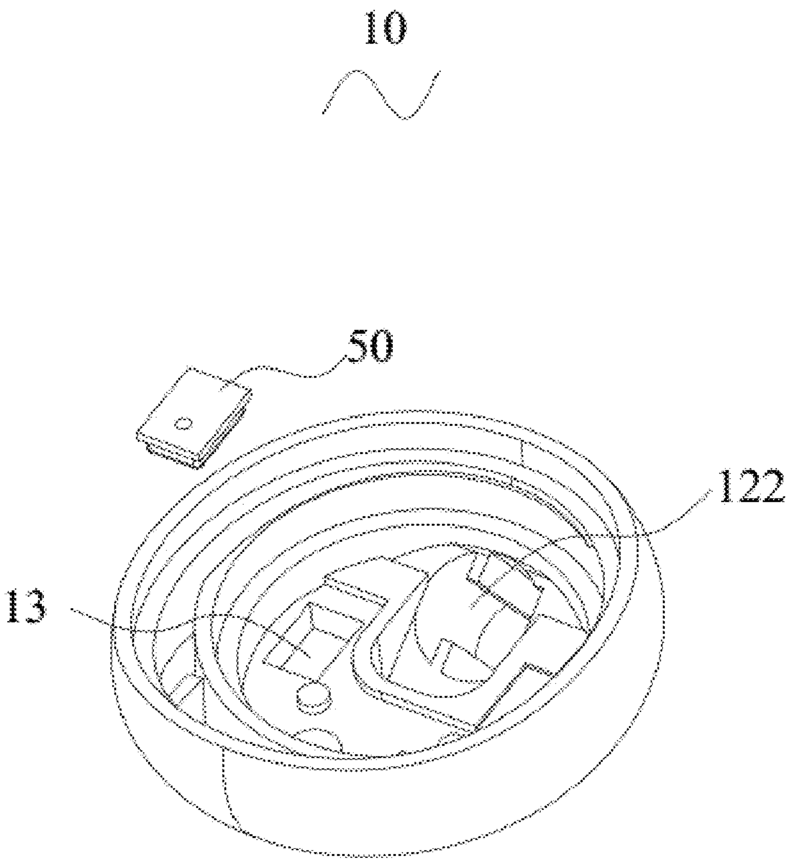
FIG. 9 is a schematic diagram of the housing of the speaker device shown in FIG. 1.

FIG. 9 is a schematic diagram showing a structure of an interior of the housing.

As shown in FIG. 9, the speaker device further comprises a pickup microphone 50, a mounting groove 13 configured to accommodate the pickup microphone 50 is defined on an inner wall of the housing 10. A shape of the mounting groove 13 is adapted to a shape of the pickup microphone 50, so that the pickup microphone 50 is embedded in the mounting groove 13. In the embodiment of the present disclosure, the pickup microphone 50 is in a shape of a cuboid. Correspondingly, the mounting groove 13 is in a shape of a cuboid groove matched with the pickup microphone 11. Therefore, the pickup microphone 11 is embedded in the mounting groove 13.

Figure 10:
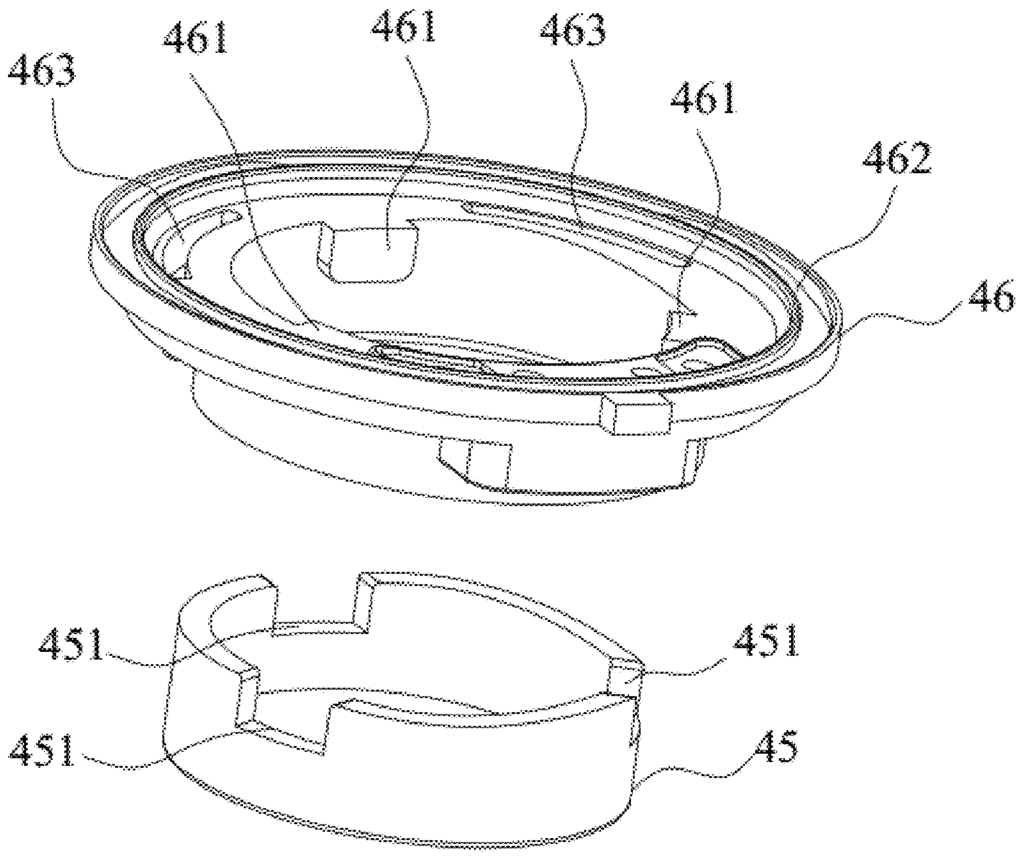
FIG. 10 is a schematic diagram of the coil iron support and a U-shaped cup.

As shown in FIG. 10, FIG. 10 is a schematic diagram of the coil iron support 46 and the U-shaped cup 45 of the speaker device. Three protrusions 461 are disposed on the inner ring of the moving coil support 46. Three clamping grooves 451 are defined on a side wall of the U-shaped cup 45. The clamping groove 451 are respectively matched with the protrusions 461. The U-shaped cup 45 is configured to package the moving coil assembly 40. After the moving coil support 46 is assembled, the moving coil assembly 40 is initially packaged. Then, the three clamping grooves 451 of the U-shaped cup 45 and the three protrusions 461 of the moving coil support 46 are aligned and assembled to complete the packaging of the moving coil assembly 40. A packaging process thereof is simplified by using the above assembly method. It is understood that, in the embodiments of the present disclosure, a manner in which the three protrusions 461 are assembled with the three clamping grooves 451 is only an optional implementation, and in other embodiments of the present disclosure, the number of the protrusions 461 and the number of the clamping grooves 451 may be other predetermined numbers, which is not specifically limited.

In addition, a slot 462 is defined on one side of the moving coil support 46 facing the coil iron support 20. The moving coil supporting portion 22 of the coil iron support 20 is partially accommodated in the slot 462. The coil iron support 20 is snapped in the slot of the moving coil support 46, which further improves assembly stability.

Figure 11:
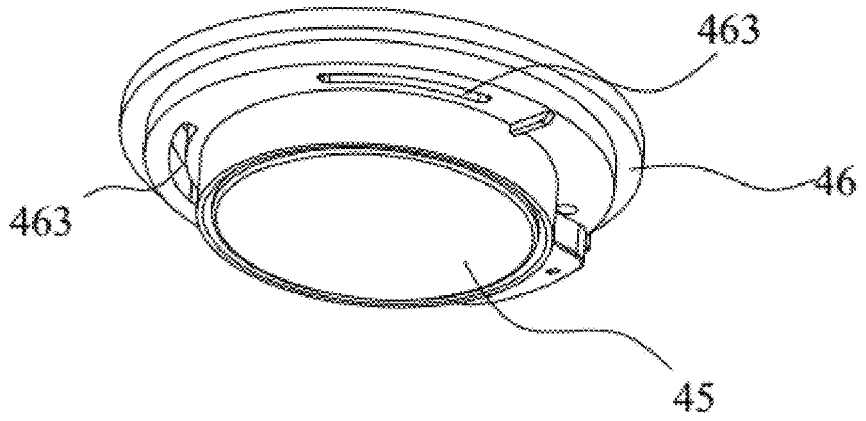
FIG. 11 is a schematic diagram of a moving coil support, the U-shaped cup, and a voice diaphragm according to one embodiment of the present disclosure, where the moving coil support, the U-shaped cup, and the voice diaphragm are assembled together.
Figure 12:
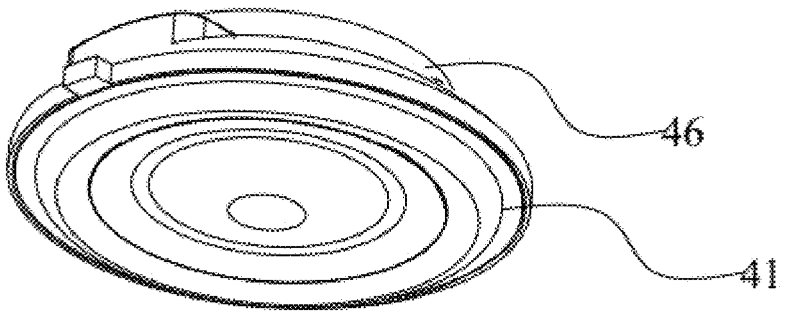
FIG. 12 is another schematic diagram of the moving coil support, the U-shaped cup, and the voice diaphragm shown in FIG. 11.

Furthermore, as shown in FIGS. 11-12, in one embodiment, two sound-transmitting holes 463 are defined on the moving coil support 46, and the two sound-transmitting holes 463 penetrate the moving coil support 46 in an axial direction thereof. Therefore, the cavity of the housing 10 is communicated with a space at a lower end of the moving coil support 46 through the sound transmitting hole 463 (it is understood that the housing 10 is only an upper shell of the speaker device, a lower shell is not shown in the drawings, the moving coil support 46 is disposed at a joint of the upper shell and the lower shell, an outer edge of the moving coil support 46 is completely attached to the inner wall of the upper shell, and the air is circulated through the sound-transmitting holes 463). Specifically, the sound-transmitting holes 463 are arc-shaped and extends along an edge of the moving coil support 46. The audio emitted by the voice diaphragm 41 is transmitted to the cavity of the lower shell of the speaker device through the sound transmitting holes 463 of the moving coil support 46. In this way, the audio finally output through the sound outlet hole 122 is long-lasting, and the sound quality is further improved.

By way of example and not limitation, in the embodiment of the present disclosure, the sound-transmitting holes 463 have a simulated curvature consistent with a curvature of the moving coil support 45, which enables the sound-transmitting holes 463 to have a good sound-transmitting effect. In other embodiments of the present disclosure, a shape of the sound-transmitting holes 463 is not specifically limited. Furthermore, providing two sound-transmitting holes 463 is also an optional embodiment of the present disclosure, which is not specifically limited thereto.

In summary, compared with the prior art, in the embodiments of the present disclosure, during actual production and assembly process, the moving iron assembly 30 is inserted into the coil iron support 20 for assembling. The voice diaphragm 41, the voice coil 42, the washer 43, and the magnet 44 are sequentially stacked and assembled to form the moving coil assembly 40, and then the moving coil assembly 40 is assembled with the coil iron support 20, so that the internal sounding components of the speaker device are simple to assemble, stable in assembly, and good in assembly effect. At the same time, the sound production areas of the moving iron assembly 30 and the moving coil assembly 400 are located in the cavity defined by the voice diaphragm 41, the coil iron support 20, and the housing 10. By using the moving iron assembly 30, clear and melodious sound quality of middle and high voice bands is achieved, and by using the moving coil assembly 40, steady sound quality in low voice bands is achieved. The sound emitted by the moving iron assembly 30 and the moving coil assembly 40 forms resonance in the cavity, which optimizes the sound quality of output audio. In addition, the moving iron supporting portion 21 greatly improves the volume of the cavity in the housing since the moving iron supporting portion 21 is arched toward the inner wall of the housing 10, so that the audio output effect is good.

The moving iron assembly 30 is disposed toward the sound outlet hole 101 so that the sound outputted by the moving iron assembly 30 is directly transmitted to the sound outlet hole 101 through the cavity without obstruction, making the sound output effect good. The clamping grooves 451 of the U-shaped cup 45 are one-to-one connected to the protrusions 461 of the moving coil support 46 to complete packaging of the moving coil assembly 40, which simplifies the assembly process.

The present disclosure further provides earphones, the earphones comprise at least one speaker device mentioned above. The earphones may be wired earphones or wireless earphones, in-ear earphones, earphones with ear hooks, or medical devices such as hearing aids in a form of earphones, which are not limited thereto.

The above-mentioned embodiments only represent some embodiments of the present disclosure. The descriptions thereof are specific and detailed, but should not be construed as a limitation of the scope of the present disclosure. It should be pointed out that for those of ordinary skill in the art, without departing from the concept of the present disclosure, modifications and improvements can be made. The modifications and the improvements belong to the protection scope of the present disclosure. Therefore, the protection scope of the present disclosure should be subject to the attached claims.

What is claimed is:

1. A speaker device, comprising:

a housing, a coil iron support connected to the housing, a moving iron assembly, and a moving coil assembly;

wherein the moving iron assembly and the moving coil assembly are disposed on the coil iron support; a cavity is defined in the housing for accommodating the coil iron support, the moving iron assembly, and the moving coil assembly;

wherein a periphery of the coil iron support is embedded in an inner side of the housing; the coil iron support comprises a moving iron supporting portion and a moving coil supporting portion; the moving iron supporting portion is disposed on one side of the moving coil supporting portion; the moving iron assembly is partially disposed on the moving iron supporting portion; the moving coil assembly comprises a voice diaphragm, a voice coil, a washer, and a magnet; the voice diaphragm, the voice coil, the washer, and the magnet are stacked in sequence, a periphery of the voice diaphragm is fixedly clamped in an inner side of the moving coil supporting portion; the voice coil, the washer, the magnet, and the voice diaphragm are coaxially disposed;

wherein the moving coil assembly further comprises a U-shaped cup and a moving coil support; an upper surface of the moving coil support is attached to an outer edge of a lower end surface of the voice diaphragm; the U-shaped cup is configured to block an inner ring of the moving coil support, so that a lower end of the moving coil assembly is sealed.

2. The speaker device according to claim 1, wherein the moving coil supporting portion is annular; a protruding tongue protruding towards the moving iron supporting portion is disposed on an annular inner wall of the moving coil supporting portion; a first fixing groove is defined in the protruding tongue; the moving iron supporting portion is arched and comprises a fixing portion disposed in a middle portion thereof and connecting arms respectively disposed on two ends thereof; a tail end of each of the connecting arms is connected to the moving coil supporting portion; a second fixing groove is defined on one side, facing the first fixing groove, of a middle portion of the fixing portion; the moving iron assembly is disposed between the first fixing groove and the second fixing groove.

3. The speaker device according to claim 2, wherein the first fixing groove comprises a first bottom support wall and first clamping walls perpendicular to the first bottom support wall; the first clamping walls and the first bottom support wall are enclosed to form a first L-shaped support structure; the fixing portion is recessed to form the second fixing groove; the second fixing groove comprises a second bottom support wall and second clamping walls perpendicular to the second bottom support wall; the second bottom support wall is parallel to the first bottom support wall; the second clamping walls and the second bottom support wall are enclosed to form a second L-shaped support structure opposite to the first fixing groove.

4. The speaker device according to claim 3, wherein the housing is bulged; a sound tube is disposed on the housing; the sound tube is circular and hollow; a sound outlet hole is formed in the sound tube; the first clamping walls and the second clamping walls are aligned with the sound outlet hole.

5. The speaker device according to claim 3, wherein the protruding tongue extends outward to form the first bottom support wall.

6. The speaker device according to claim 2, wherein a middle portion of the moving iron supporting portion is hollow, so that the protruding tongue and the moving iron supporting portion are enclosed to form a limiting hole.

7. The speaker device according to claim 1, wherein the speaker device further comprises a pickup microphone; a mounting groove configured to accommodate the pickup microphone is defined on an inner wall of the housing; a shape of the mounting groove is adapted to a shape of the pickup microphone, so that the pickup microphone is embedded in the mounting groove.

8. The speaker device according to claim 1, wherein at least one protrusion is disposed on the inner ring of the moving coil support; at least one clamping groove is defined on a side wall of the U-shaped cup; the at least one clamping groove is matched with the at least one protrusion.

9. The speaker device according to claim 1, wherein a slot is defined on one side of the moving coil support facing the coil iron support; the moving coil supporting portion is partially accommodated in the slot.

10. The speaker device according to claim 1, wherein at least one sound-transmitting hole is defined on the moving coil support, and the at least one sound-transmitting hole penetrates the moving coil support in an axial direction thereof.

11. The speaker device according to claim 10, wherein the at least one sound-transmitting hole is arc-shaped and extends along an edge of the moving coil support.

12. An earphone, comprising the speaker device according to claim 1.

* * * * *